(12) United States Patent
Chida et al.

(10) Patent No.: US 6,568,267 B2
(45) Date of Patent: May 27, 2003

(54) SENSING DEVICE AND SENSOR APPARATUS

(75) Inventors: Kazumi Chida, Nisshin (JP); Masato Hashimoto, Toyota (JP); Masaru Nagao, Kaifu-gun (JP); Hidemi Senda, Toyota (JP); Norihisa Okayama, Nishikamo-gun (JP); Keiko Neki, Toyota (JP); Masahiro Sugimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/838,287

(22) Filed: Apr. 20, 2001

(65) Prior Publication Data

US 2001/0045127 A1 Nov. 29, 2001

(30) Foreign Application Priority Data

May 22, 2000 (JP) ......................... 2000-149558

(51) Int. Cl.$^7$ ............................................. G01C 19/00
(52) U.S. Cl. ................................................. 73/504.12
(58) Field of Search ...................... 73/504.12, 504.16, 73/504.02

(56) References Cited

U.S. PATENT DOCUMENTS 5,574,222 A   11/1996  Offenberg ................ 73/514.32
6,067,858 A  *  5/2000  Clark et al. ............... 73/504.16
6,250,156 B1 *  6/2001  Seshia et al. ............. 73/504.12
6,327,907 B1 * 12/2001  Park ........................ 73/504.12

FOREIGN PATENT DOCUMENTS

| EP | 0 785 413 A2 | 7/1997 |
| JP | 10-300475 | 11/1998 |
| JP | 10-325726 | 12/1998 |
| JP | 10-339640 | 12/1998 |

* cited by examiner

*Primary Examiner*—Richard A. Moller
(74) *Attorney, Agent, or Firm*—Oliff & Berridge, PLC

(57) ABSTRACT

A sensing device, such as an angular speed detecting device, includes a vibrator for improving detection precision. The vibrator is displaceably supported on a substrate and is vibrated in the direction of an X-axis by driving electrodes. Detecting electrodes detect vibrations of the vibrator in the direction of a Y-axis caused by a Coriolis' force resulting from the angular speed occurring about a Z-axis. Each of the driving and detecting electrodes includes a movable electrode that is connected to the vibrator and that is displaced together therewith on the substrate and a fixed electrode fixed onto the substrate in such a manner as to face the movable electrode. By equalizing conductors connected to fixed electrodes of the driving electrodes and conductors connected to fixed electrodes of the detecting electrodes in length, width, and thickness, respectively, one electrical characteristic is set for those of the wiring portions which function in the same manner.

27 Claims, 7 Drawing Sheets

FIG. 1

SENSING DEVICE AND SENSOR APPARATUS

INCORPORATION BY REFERENCE

The disclosure of Japanese Patent Application No. 12-149558 filed on May 22, 2000 including the specification, drawings and abstract is incorporated herein by reference in its entirety.

BACKGROUND OF THE INCEPTION

1. Field of Invention

The invention relates to a sensing device for detecting a physical quantity such as angular speed, acceleration, pressure, etc., in accordance with the displacement of a vibrator spaced upwards from a substrate. The invention further relates to a sensor apparatus including the sensing device.

2. Description of Related Art

It is well known to provide a sensing device that has a vibrator displaceably supported on a substrate, a plurality of electrodes, each of which is composed of a movable electrode and a fixed electrode, and a plurality of wirings allowing passage of electric signals and that detects a physical quantity such as angular speed, and a sensor apparatus including such a sensing device. The movable electrode is connected to the vibrator and is displaced together therewith on the substrate. The fixed electrode is fixed onto the substrate in such a manner as to face the movable electrode. In this kind of sensing device, as disclosed for example in Japanese Patent Application Laid-Open No. 10-300475, compensating wirings are additionally provided on the substrate for the purpose of eliminating the influence of the parasitic capacitance of the above-described wirings, thus attaining an electrically suitable balance among the wirings.

However, in the sensing device and the sensor apparatus according to the above-mentioned related art the electrical characteristic of each of the wirings is not taken into consideration. That is, resistance, capacitance, and so on of each wiring is different because of the influence of errors (disperse) in length, width, thickness and so on of the wirings. Therefore, if a plurality of electrodes are used for driving purposes, driving forces of the electrodes disperse. Further, if a plurality of electrodes are used for detecting purposes, detection values obtained from the electrodes disperse. This will eventually lead to a problem of deterioration in detecting precision of the sensing device.

Further, in the sensing device of the above-described related art, problems associated with the manufacture of beams for supporting the vibrator with respect to the substrate are not taken into account. The beams may develop notches during the manufacture. Development of notches makes vibrations of the vibrator uneven and unstable and eventually causes deterioration in detecting precision of the sensing device.

SUMMARY OF THE INVENTION

The invention is a solution to the above-mentioned problems. It is an object of the invention to provide a sensing device and a sensor apparatus capable of precise detection.

In order to achieve the above-stated object, the invention provides a sensing device comprising a vibrator displaceably supported on a substrate, a plurality of electrodes each of which comprises a movable electrode that is connected to the vibrator and that is displaced together with the vibrator on the substrate and a fixed electrode that is fixed onto the substrate in such a manner as to face the movable electrode, and a plurality of conductors (or wirings) provided on the substrate and connected to the movable and fixed electrodes to allow passage of electric signals, wherein one electrical characteristic is set for those of the conductors which allow passage of electric signals of the same kind. In this case, it is appropriate that one electrical characteristic is set for those of the conductors by equalizing length, width, and thickness of those of conductors which allow passage of electric signals of the same kind.

In this construction, one electrical characteristic is set for those of the conductors which allow passage of electric signals of the same kind. Therefore, if a plurality of electrodes are used for driving purposes, driving voltages applied to the electrodes become equal to one another, thus reducing dispersion of driving forces. Further, if a plurality of electrodes are used for detecting purposes, dispersion in detecting voltages of the electrodes is reduced. As a result, the detecting precision of the sensing device is improved.

A plurality of beams are provided between the substrate and the vibrator to displace the vibrator, the distance between one of the beams and another beam or member that is close to one side of the one of the beams and that extends parallel thereto is set equal to the distance between the one of the beams and still another beam or member that is close to the other side of the one of the beams and that extends parallel thereto.

In this construction, opposed sides of each of the beams are formed symmetrically when the conductors are formed by etching. For instance, even if notches have developed on opposed sides of each of the beams due to etching, the notches are formed symmetrically. Therefore, dispersion in electrical characteristics of the conductors can be easily reduced and thus one electrical characteristic can be easily set for a plurality of conductors.

BRIEF DESCRIPTION OF THE DRAWINGS

The above and other objects, features, advantages, and technical and industrial significance of this invention will be better understood by reading the following detailed description of the preferred embodiments of the invention, when considered in connection with the accompanying drawings, in which:

FIG. 1 is a plan view of an angular speed detecting device comprising a semiconductor material according to a first embodiment of the invention;

DETAILED DESCRIPTION OF PREFERRED EMBODIMENTS

In the following description and the accompanying drawings, the invention will be described in more detail in terms of specific embodiments.

First of all, an angular speed detecting device as a sensing device according to a first embodiment of the invention will be described. In FIGS. 1 to 4, members indicated by dots are spaced from the upper surface of a substrate 10, and members indicated by diagonal lines are not spaced from the substrate 10 but are fixed to the substrate 10.

This angular speed detecting device is formed symmetrically about centerlines in the direction of X and Y-axes that interest perpendicularly to each other on a horizontal plane. The substrate 10 is formed from silicon into a quadrate shape. A vibrator 20, a pair of main flames 30-1, 30-2, and a pair of subsidiary frames 30-3, 30-4 extend in a horizontal plane that is spaced a predetermined distance from the upper surface of the substrate 10.

Figure 6A:
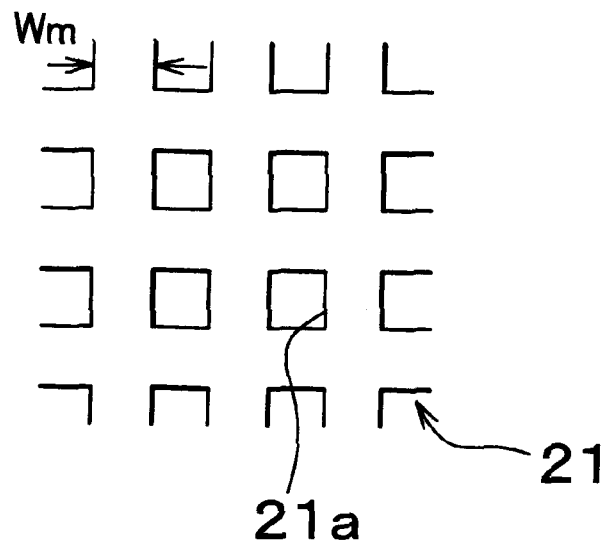
FIG. 6A is an enlarged plan view of a mass portion shown in FIG. 1.

The vibrator 20, while vibrating in the direction of the X-axis, vibrates in the direction of the Y-axis due to the angular speed occurring about a Z-axis perpendicular to the X and Y-axes, with an amplitude proportional to the magnitude of the angular speed. The vibrator 20 has a generally "H" shape. That is, the vibrator 20 has a generally quadrate mass portion 21 which has an appropriate mass and which is provided in a central portion of the vibrator 20 in such a manner that the sides of the mass portion 21 extend in the direction of the X-axis or the Y-axis, and four arm portions 22-1 to 22-4 which extend from corresponding vertex sites of the mass portion 21 in the direction of the X-axis. Although not shown in FIG. 1, a plurality of quadrate through-holes 21a as shown in FIG. 6A are provided in wide regions of the mass portion 21, the arm portions 22-1 to 22-4, and so on.

The main frames 30-1, 30-2 vibrate the vibrator 20 in the direction of the X-axis. Each of the main frames 30-1, 30-2 has a generally "I" shape. That is, each main frame has a wide elongated portion 31-1 or 31-2 that extends in the direction of the X-axis, at a position that is outward of the adjacent arm portions 22-1, 22-2 or 22-3, 22-4 of the vibrator 20 with respect to the direction of the Y-axis, and wide and short terminal portions 32-1, 32-2 or 32-3, 32-4 that extend from opposite ends of the elongated portion 31-1 or 31-2 toward opposite sides of the elongated portion in the direction of the Y-axis. The subsidiary frames 30-3, 30-4 also have an increased width, and extend in the direction of the X-axis, at positions outward of the elongated portions 31-1, 31-2 with respect to the direction of the Y-axis. Through-holes identical with the through-holes 21a in the vibrator 20 are also provided in the main frames 30-1, 30-2 and the subsidiary frames 30-3, 30-4.

The main frames 30-1, 30-2 are connected to the vibrator 20 via beams 33-1 to 33-4. The beams 33-1 to 33-4 also extend in the direction of the X-axis in a horizontal plane spaced a predetermined distance from the upper surface of the substrate 10. Each of the beams 33-1 to 33-4 is connected at one end thereof to a near basal portion of a corresponding one of the arm portions 22-1 to 22-4 of the vibrator 20. The other end of each beam is connected to a corresponding one of the terminal portions 32-1 to 32-4 of the main frames 30-1, 30-2. The beams 33-1 to 33-4 are narrower than the arm portions 22-1 to 22-4 of the vibrator 20, and than the elongated portions 31-1, 31-2 and the terminal portions 32-1 to 32-4 of the main frames 30-1, 30-2. Therefore, vibrations in the direction of the Y-axis are not easily conveyed from the main frames 30-1, 30-2 to the vibrator 20 whereas vibrations in the direction of the X-axis are efficiently conveyed from the main frames 30-1, 30-2 to the vibrator 20. Furthermore, the vibrator 20 vibrates more easily in the direction of the Y-axis than in the direction of the X-axis, with respect to the main frames 30-1, 30-2. That is, the beams 33-1 to 33-4 have the function of supporting the vibrator 20 in such a manner that the vibrator 20 can vibrate in the direction of the Y-axis with respect to the substrate 10, the main frames 30-1, 30-2 and the subsidiary frames 30-3, 30-4.

The main frame 30-1 is supported for vibrating movements to the substrate 10 via anchors 41a to 41d, beams 42a to 42d, the subsidiary frame 30-3, and beams 43a to 43d. The anchors 41a to 41d are fixed to the upper surface of the substrate 10, at positions outward of the elongated portion 31-1 of the main frame 30-1 with respect to the direction of the Y-axis. Each of the beams 42a to 42d is connected at one end thereof to a corresponding one of the anchors 41a to 41d, and extends from the anchor 41a to 41d outward in the direction of the Y-axis. A distal end of each of the beams 42a to 42d is connected to an inward end of the subsidiary frame 30-3. Each of the beams 43a to 43d, extending inward of the subsidiary frame 30-3 with respect to the direction of the Y-axis, is connected at one end thereof to the subsidiary frame 30-3. The other end of each of the beams 43a to 43d is connected to an outward end of the elongated portion 31-1 of the main frame 30-1 that faces outward in the direction of the Y-axis. The beams 42a to 42d and the beams 43a to 43d are spaced a predetermined distance from the substrate 10, as in the case of the vibrator 20, the main frames 30-1, 30-2 and the subsidiary frames 30-3, 30-4 and have a reduced width as in the case of the beams 33-1 to 33-4.

The main frame 30-2 is supported for vibrating movements to the substrate 10 via anchors 44a to 44d, beams 45a to 45d, the subsidiary frame 30-4 and beams 46a to 46d. The anchors 44a to 44d, the beams 45a to 45d, the subsidiary frame 30-4 and the beams 46a to 46d are formed symmetrically about the centerline in the direction of the Y-axis and substantially in the same manner as the anchors 41a to 41d, the beams 42a to 42d, the subsidiary frame 30-3 and the beams 43a to 43d, respectively. With this arrangement, the main frames 30-1, 30-2 are supported so that the main frames easily vibrate in the direction of the X-axis and do not easily vibrate in the direction of the Y-axis with respect to the substrate 10. That is, the beams 42a to 42d, 43a to 43d, 45a to 45d, and 46a to 46d have the function of supporting the main frames 30-1, 30-2, the subsidiary frames 30-3, 30-4, and the vibrator 20 in such a manner that they vibrate in the direction of the X-axis with respect to the substrate 10.

Provided on the substrate 10 are driving electrodes 51-1 to 51-4 for driving the main frames 30-1, 30-2 relatively to the substrate 10 in the direction of the X-axis, drive monitor electrodes 52-1 to 52-4 for monitoring the driving of the main frames 30-1, 30-2 relative to the substrate 10 in the direction of the X-axis, detecting electrodes 53-1 to 53-4 for detecting the vibration of the vibrator 20 relative to the substrate 10 in the direction of the Y-axis, correcting electrodes 54-1 to 54-4 for counterbalancing the influence of the diagonal vibrations of the main frames 30-1, 30-2 due to the driving (vibration components in the direction of the Y-axis), adjusting electrodes 55-1 to 55-4 for adjusting the resonance frequency of the vibrator 20, and servo electrodes 56-1 to 56-4 for counterbalancing the vibration of the vibrator 20 in the direction of the Y-axis.

Each of the driving electrodes 51-1 to 51-4 has, at a position outward of a corresponding one of the terminal portions 32-1 to 32-4 of the main frames 30-1, 30-2 with respect to the direction of the X-axis, each of comb-like electrodes (also called "fixed electrode") 51$a$1 to 51$a$4 that has a plurality of electrode fingers that extend toward the corresponding one of the terminal portions 32-1 to 32-4 in the direction of the X-axis. Each comb-like electrode 51$a$1 to 51$a$4 is connected to a pad 51$c$1 to 51$c$4 via a wiring (or conductor) portion 51$b$1 to 51$b$4 that extends outward with respect to the direction of the X-axis. The fixed electrodes 51$a$1 to 51$a$4, the wiring portions 51$b$1 to 51$b$4, and the pads 51$c$1 to 51$c$4 are fixed to the upper surface of the substrate 10. Each pad 51$c$1 to 51$c$4 has, on its upper surface, an electrode pad 51$d$1 to 51$d$4 that is formed from an electrically conductive metal (e.g., aluminum).

The terminal portions 32-1 to 32-4 are provided with comb-like movable electrodes 32$a$1 to 32$a$4 each having a plurality of electrode fingers that extend outward in the direction of the X-axis. The movable electrodes 32$a$1 to 32$a$4 face the fixed electrodes 51$a$1 to 51$a$4, respectively. The movable electrodes 32$a$1 to 32$a$4 are formed together with the terminal portions 32-1 to 32-4, respectively, and are spaced a predetermined distance from the upper surface of the substrate 10. Each electrode finger of each of the movable electrodes 32$a$1 to 32$a$4 is inserted into a widthwise central position between adjacent electrode fingers of the corresponding one of the fixed electrodes 51$a$1 to 51$a$4, and faces those adjacent electrode fingers.

Each of the drive monitor electrodes 52-1 to 52-4 has, at a position inward of a corresponding one of the terminal portions 32-1 to 32-4 of the main frames 30-1, 30-2 with respect to the direction of the X-axis, a comb-like electrode 52$a$1 to 52$a$4 having a plurality of electrode fingers that extend toward the corresponding one of the terminal portions 32-1 to 32-4 in the direction of the X-axis. Each comb-like electrode 52$a$1 to 52$a$4 is connected to a pad 52$c$1 to 52$c$4 via a wiring portion 52$b$1 to 52$b$4 that extends outward with respect to the direction of the X-axis. The fixed electrodes 52$a$1 to 52$a$4, the wiring portions 52$b$1 to 52$b$4, and the pads 52$c$1 to 52$c$4 are fixed to the upper surface of the substrate 10. Each pad 52$c$1 to 52$c$4 has, on its upper surface, an electrode pad 52$d$1 to 52$d$4 that is formed from an electrically conductive metal (e.g., aluminum).

The terminal portions 32-1 to 32-4 are provided with comb-like movable electrodes 32$b$1 to 32$b$4 each having a plurality of electrode fingers that extend inward in the direction of the X-axis. The movable electrodes 32$b$1 to 32$b$4 face the fixed electrodes 52$a$1 to 52$a$4, respectively. The movable electrodes 32$b$1 to 32$b$4 are formed together with the terminal portions 32-1 to 32-4, respectively, and are spaced a predetermined distance from the upper surface of the substrate 10. Each electrode finger of each of the movable electrodes 32$b$1 to 32$b$4 is inserted to a widthwise central position between adjacent electrode fingers of the corresponding one of the fixed electrodes 52$a$1 to 52$a$4, and faces those adjacent electrode fingers.

Each of the detecting electrodes 53-1 to 53-4 has, at a position outward of the mass portion 21, a comb-like fixed electrode 53$a$1 to 53$a$4 that has a plurality of electrode fingers that extend inward and outward in the direction of the X-axis. Each fixed electrode 53$a$1 to 53$a$4 is connected to a pad 53$c$1 to 53$c$4 via a wiring portion 53$b$1 to 53$b$4 that extends outward in the direction of the X-axis. The fixed electrodes 53$a$1 to 53$a$4, the wiring portions 53$b$1 to 53$b$4, and the pads 53$c$1 to 53$c$4 are fixed to the upper surface of the substrate 10. Each pad 53$c$1 to 53$c$4 has, on its upper surface, an electrode pad 53$d$1 to 53$d$4 that is formed from an electrically conductive metal (e.g., aluminum).

The mass portion 21 of the vibrator 20 has comb-like movable electrodes 21$a$1 to 21$a$4 each of which has a plurality of electrode fingers that extend outward in the direction of the X-axis. Each of the movable electrodes 21$a$1 to 21$a$4 faces one side of a corresponding one of the fixed electrodes 53$a$1 to 53$a$4. Comb-like movable electrodes 22$a$1 to 22$a$4 each of which has a plurality of electrode fingers that extend inward in the direction of the X-axis are also provided in central regions of the arm portions 22-1 to 22-4 of the vibrator 20, respectively. Each of the movable electrodes 22$a$1 to 22$a$4 faces the other side of a corresponding one of the fixed electrodes 53$a$1 to 53$a$4. The comb-like electrodes 22$a$1 to 22$a$4 face corresponding half portions of the comb-like electrodes 53$a$1 to 53$a$4. The movable electrodes 21$a$1 to 21$a$4 and 22$a$1 to 22$a$4 are formed together with the mass portion 21 and the arm portions 22-1 to 22-4, respectively, and are spaced a predetermined distance from the upper surface of the substrate 10. Each of the electrode fingers of each of the movable electrodes 21$a$1 to 21$a$4 and 22$a$1 to 22$a$4 is inserted between adjacent electrode fingers of the corresponding one of the fixed electrodes 53$a$1 to 53$a$4, and faces those adjacent electrode fingers. In this case, the electrode fingers of each of the movable electrodes 21$a$1 to 21$a$4 and 22$a$1 to 22$a$4 are offset toward one side from widthwise central positions between adjacent electrode fingers of the corresponding one of the fixed electrodes 53$a$1 to 53$a$4. The offset direction in the case of the detecting electrodes 53-1, 53-2 is opposite to the offset direction in the case of the detecting electrodes 53-3, 53-4.

Each of the correcting electrodes 54-1 to 54-4 is provided in an inward region of a corresponding one of the terminal portions 32-1 to 32-4 of the main frames 30-1, 30-2 with respect to the direction of the Y-axis. The correcting electrodes 54-1 to 54-4 are provided inward and outward with respect to the direction of the X-axis. Each of the correcting electrodes 54-1 to 54-4 has a comb-like fixed electrode 54$a$1 to 54$a$4 that has a plurality of electrode fingers that extend in the direction of the X-axis. Each of the fixed electrodes 54$a$1 to 54$a$4 is connected to a corresponding one of the wiring portions 53$b$1 to 53$b$4 that are also used for the detecting electrodes 53-1 to 53-4 respectively.

Comb-like movable electrodes 32$c$1 to 32$c$4 each of which has a plurality of electrode fingers that extend inward and outward with respect to the direction of the X-axis are provided in inward regions of the terminal portions 32-1 to 32-4 of the main frames 30-1, 30-2 with respect to the direction of the Y-axis, respectively. The movable electrodes 32$c$1 to 32$c$4 face the fixed electrodes 54$a$1 to 54$a$4 respectively. The movable electrodes 32$c$1 to 32$c$4 are formed together with the main frames 30-1, 30-2, respectively, and are spaced a predetermined distance from the upper surface of the substrate 10. Each of the electrode fingers of each of the movable electrodes 32$c$1 to 32$c$4 is inserted between adjacent electrode fingers of the corresponding one of the fixed electrodes 54$a$1 to 54$a$4, and faces those adjacent electrode fingers.

Also herein, the electrode fingers of each of the movable electrodes 32c1 to 32c4 are offset toward one side from widthwise central positions between adjacent electrode fingers of the corresponding one of the fixed electrodes 54a1 to 54a4. The offset direction in the case of the correcting electrodes 54-1, 54-2 is opposite to the offset direction in the case of the detecting electrodes 54-3, 54-4. Further, the offset direction of the electrode fingers of the movable electrodes 32c1 to 32c4 is opposite to the direction in which the electrode fingers of the movable electrodes 21a1 to 21a4 and 22a1 to 22a4 are offset with respect to the electrode fingers of the fixed electrodes 54a1 to 53a4 respectively in the case of the above-mentioned detecting electrodes 53-1 to 53-4. Thus, in this case, the changes in capacitance of the correcting electrodes 54-1 to 54-4 due to displacement of the main frames 30-1, 30-2 in the direction of the Y-axis are opposite to the changes in capacitance of the detecting electrodes 53-1 to 53-4 due to displacement of the vibrator 20 in the direction of the Y-axis. That is, when the main frames 30-1, 30-2 and the vibrator 20 are displaced in the same direction, namely, in the direction of the Y-axis, the correcting electrodes 54-1 to 54-4 increase (decrease) in capacitance whereas the detecting electrodes 53-1 to 53-4 decrease (increase) in capacitance. While undesired vibrations of the main frames 30-1, 30-2 in the direction of the Y-axis may cause changes in capacitance of the correcting electrodes 54-1 to 54-4, undesired vibrations of the vibrator 20 in the direction of the Y-axis may cause changes in capacitance of the detecting electrodes 53-1 to 53-4. The correcting electrodes 54-1 to 54-4 and the detecting electrodes 53-1 to 53-4 must be designed such that the correcting electrodes 54-1 to 54-4 and the detecting electrodes 53-1 to 53-4 change in capacitance in opposite direction and by the same magnitude.

Each of the adjusting electrodes 55-1 to 55-4 is provided in a central portion of the substrate 10 in the direction of the Y-axis, at a position outward of the mass portion 21 of the vibrator 20 with respect to the direction of the X-axis, and has a pair of fixed electrodes 55a1 to 55a4 that extend in the direction of the X-axis. The fixed electrodes 55a1, 55a3 are connected to a common pad 56c1 via a common wiring portion 55b1 that extends in the direction of the X-axis. The fixed electrodes 55a2, 55a4 are connected to a common pad 56c2 via a common wiring portion 55b2 that extends in the direction of the X-axis. The fixed electrodes 55a1 to 55a4, the wiring portions 55b1, 55b2, and the pads 55c1, 55c2 are fixed to the upper surface of the substrate 10. Each of the pads 55c1, 55c2 has, on its upper surface, an electrode pad 55d1, 55d2 formed from an electrically conductive metal (e.g., aluminum).

Each of the paired fixed electrodes 55a1 to 55a4 has a paired movable electrode 23a1 to 23a4 that is formed together with the vibrator 20 and that extends in the direction of the X-axis. Each of the paired movable electrodes 23a1 to 23a4 is disposed in an opposed manner in the direction of the Y-axis. Each of the movable electrodes 23a1 to 23a4 is formed together with an inward end of a T-shaped portion 23-1 to 23-4 with respect to the direction of the Y-axis. The T-shaped portions 23-1 to 23-4 protrude in the direction of the X-axis from opposed sides of the mass portion 21 of the vibrator 20 in the direction of the X-axis. The T-shaped portions 23-1 to 23-4 and the movable electrodes 23a1 to 23a4 are formed together with the vibrator 20 and spaced a predetermined distance from the upper surface of the substrate 10.

Each of the servo electrodes 56-1 to 56-4 is provided at a position inward of a corresponding one of the detecting electrodes 53-1 to 53-4, and has a pair of fixed electrodes 56a1 to 56a4 that extend in the direction of the X-axis. The fixed electrodes 56a1 to 56a4 are connected to pads 56c1 to 56c4 via wiring portions 56b1 to 56b4 that extend in the direction of the X-axis, respectively. The fixed electrodes 56a1 to 56a4, the wiring portions 56b1 to 56b4, and the pads 56c1 to 56c4 are fixed to the upper surface of the substrate 10. Each of the pads 56c1 to 56c4 has, on its upper surface, an electrode pad 56d1 to 56d4 formed from an electrically conductive metal (e.g., aluminum).

Each of the paired fixed electrodes 56a1 to 56a4 has a paired movable electrode 23b1 to 23b4 that is formed together therewith at an outward end of the corresponding one of the T-shaped portions 23-1 to 23-4 with respect to the direction of the Y-axis. Each of the paired movable electrodes 23b1 to 23b4 is disposed in an opposed manner in the direction of the Y-axis. Each of the movable electrodes 23b1 to 23b4 is also formed together with the vibrator 20 and spaced a predetermined distance from the upper surface of the substrate 10.

Furthermore, the substrate 10 has, on its upper surface, a pad 20b that is connected to the vibrator 20 via the beams 33-3, 33-4, the main frame 30-2, the beams 46a to 46d, the subsidiary frame 30-4, the beam 45a, the anchor 44a, and an L-shaped wiring portion 20a. Both the wiring portion 20a and the pad 20b are fixed to the upper surface of the substrate 10. The pad 20b has, on its upper surface, an electrode pad 20c formed from an electrically conductive metal (e.g., aluminum).

Figure 2:
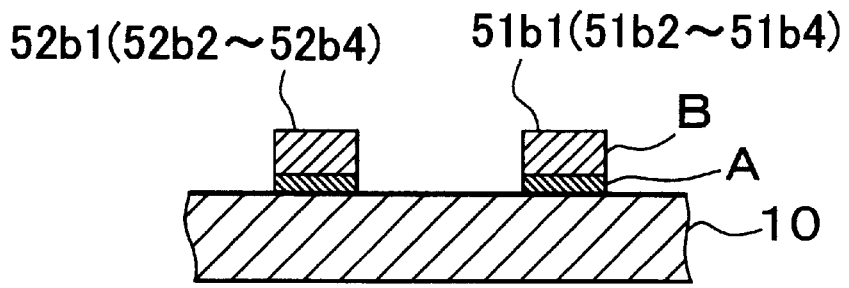
FIG. 2 is a sectional view taken along lines A1—A1, A2—A2, A3—A3 and A4—A4 of the angular speed detecting device shown in FIG. 1.
Figure 3:
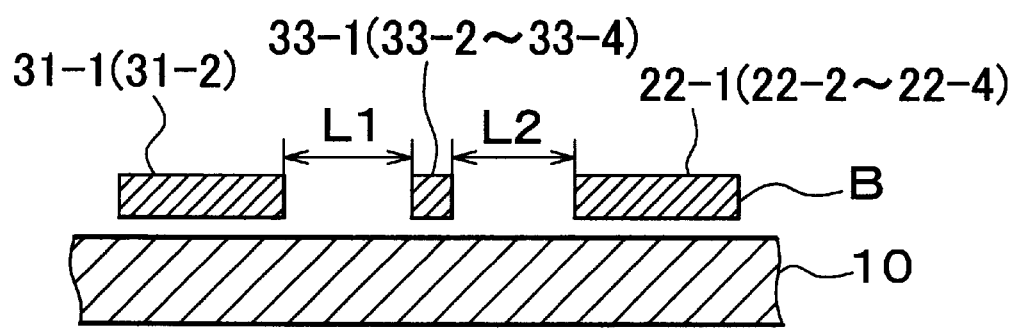
FIG. 3 is a sectional view taken along lines B1—B1, B2—B2, B3—B3 and B4—B4 of the angular speed detecting device shown in FIG. 1.
Figure 4:
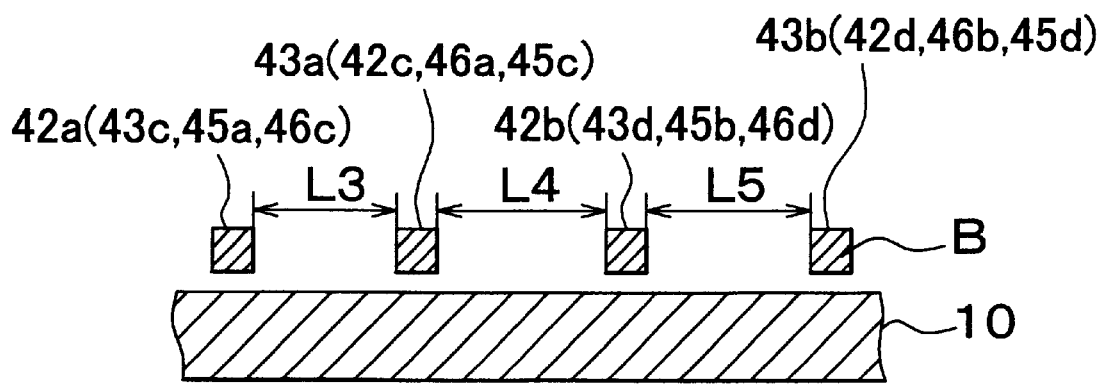
FIG. 4 is a sectional view taken along lines C1—C1, C2—C2, C3—C3 and C4—C4 of the angular speed detecting device shown in FIG. 1.

Next, a method of manufacturing an angular speed detecting device constructed as described above will be described. First of all, an SOI (silicon-on-insulator) substrate, in which a single-crystal silicon layer (e.g., with a membrane thickness of 40 $\mu$m) is disposed on an upper surface of a single-crystal silicon layer via a silicon oxidation membrane (e.g., with a membrane thickness of 4.5 $\mu$m), is prepared. The uppermost single-crystal silicon layer is reduced in resistance by being doped with impurities such as phosphorus and boron. Hereinafter, as shown in FIGS. 2 to 4, the lowermost single-crystal silicon layer, the intermediate silicon oxidation film, and the uppermost single-crystal silicon layer that has been reduced in resistance will be referred to as the substrate 10, an insulating layer A, and a low-resistance layer (electric conductor) B, respectively.

Figure 1:
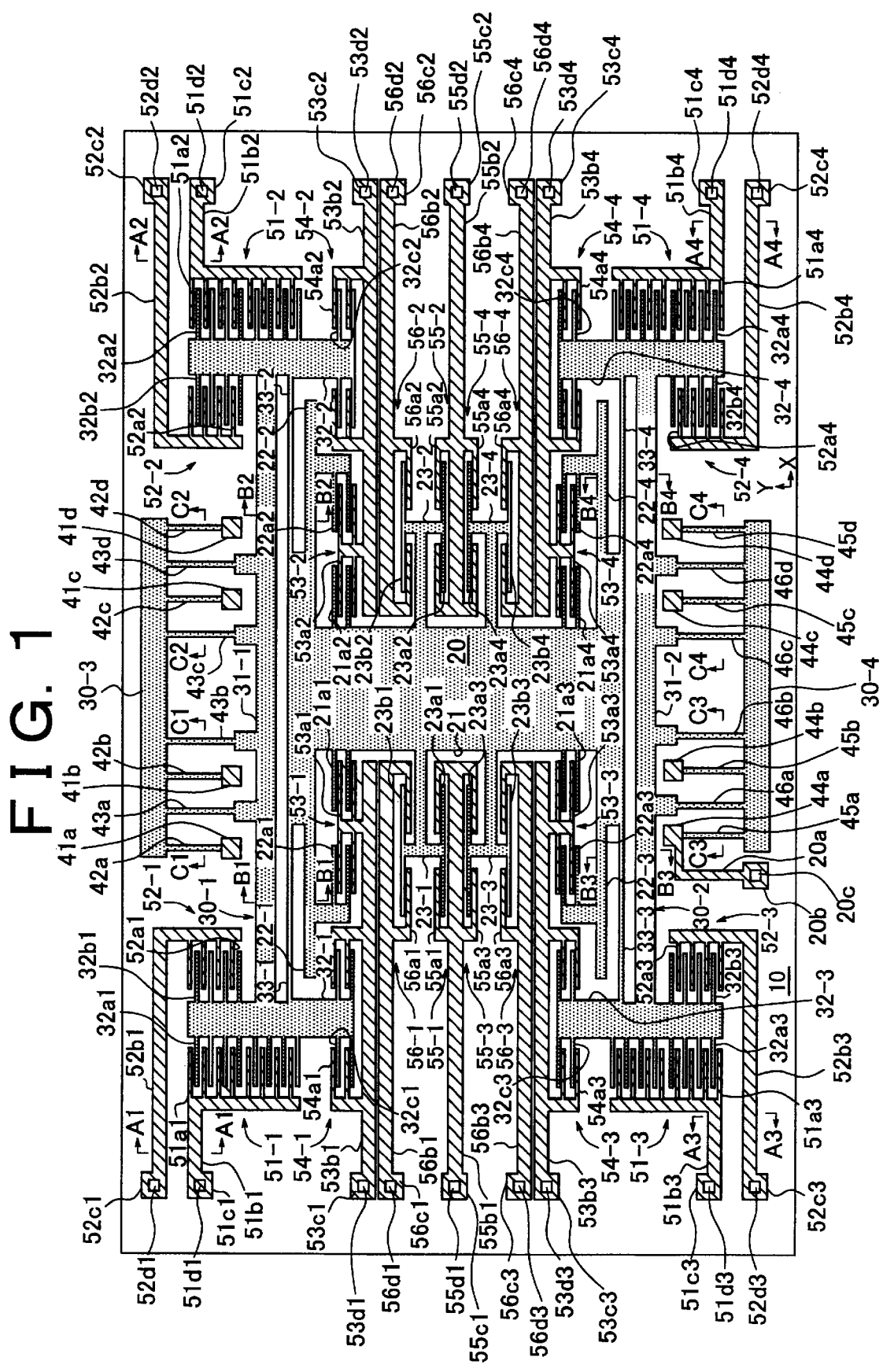

Next, regions which are indicated by diagonal lines in FIG. 1 and which include the electrode fingers are masked with a resist layer, and the low-resistance layer B is etched through reactive ion etching and so on, thus forming the anchors 41a to 41d and 44a to 44d, the fixed electrodes 51a1 to 51a4, 52a1 to 52a4, 53a1 to 53a4, 54a1 to 54a4, 55a1 to 55a4, and 56a1 to 56a4, the wiring portions 20a, 51b1 to 51b4, 52b1 to 52b4, 53b1 to 53b4, 55b1, 55b2, and 56b1 to 56b4, and the pads 20b, 51c1 to 51c4, 52c1 to 52c4, 53c1 to 53c4, 55c1, 55c2, and 56c1 to 56c4 (the members described in the foregoing description as being fixed to the substrate 10) on the insulating layer A.

Next, the insulating layer A that remains in regions where the above-mentioned members are not formed is etched and eliminated using an aqueous solution of hydrofluoric acid and so on, thus forming the vibrator 20, the beams 33-1 to 33-4, the main frames 30-1, 30-2, the subsidiary frames 30-3, 30-4, the beams 42a to 42d, 43a to 43d, 45a to 45d, 46a to 46d, and the movable electrodes 32a1 to 32a4, 32b1 to 32b4, 21a1 to 21a4, 22a1 to 22a4, 32c1 to 32c4, 23a1 to 23a4, and 23b1 to 23b4 (the members described in the foregoing description as being spaced a predetermined distance from the substrate 10). The electrode pads 20c, 51d1 to 51d4, 52d1 to 52d4, 53d1 to 53d4, 55d1, 55d2, and 56d1 to 56d4 are formed on the pads 20b, 51c1 to 51c4, 52c1 to 52c4, 53c1 to 53c4, 55c1, 55c2, and 56c1 to 56c4 respectively through vaporization of aluminum and so on.

Thus, the above-described members formed on the substrate 10 (the members indicated by dots in FIG. 1) are constituted by the low-resistance layer (electric conductor) B that is insulated from the substrate 10. The vibrator 20, the beams 33-1 to 33-4, the main frames 30-1, 30-2, the subsidiary frames 30-3, 30-4, the beams 42a to 42d, 43a to 43d, 45a to 45d, and 46a to 46d, and the movable electrodes 32a1 to 32a4, 32b1 to 32b4, 21a1 to 21a4, 22a1 to 22a4, 32c1 to 32c4, 23a1 to 23a4, and 23b1 to 23b4 are spaced a predetermined distance from the substrate 10 and are supported for vibrating movements to the substrate 10 via the anchors 41a to 41d and 44a to 44d.

In the manufacturing method as described hereinbefore, high detecting precision is achieved if the wiring portions as well as the fixed electrodes and the movable electrodes of the electrodes 51-1 to 51-4, 52-1 to 52-4, 53-1 to 53-4, 54-1 to 54-4, 55-1 to 55-4, and 56-1 to 56-4 are disposed symmetrically about the center of the device in four direction. In particular, the wiring portions are equivalent in length, width, and thickness for the electrodes of the same kind so that the electrical characteristics of the wiring portions such as capacitance and resistance are matched to one another. For instance, as shown in FIG. 2, the wiring portions 51b1 to 51b4 are equivalent in length, width, and thickness, and the wiring portions 52b1 to 52b4 are equivalent in length, width, and thickness. If the electrical characteristics are inconsistent, the detecting precision and the detecting sensitivity deteriorate and disperse to an increased extent among different devices. In the device of this embodiment, the present standard of manufacturing semiconductor materials guarantees to process the electrodes of the same kind to such an extent that the dispersion in length and thickness of the wiring portions thereof can be regarded as substantially "0". The processing can be performed such that the dispersion in width settles approximately within ±5%, and thus the satisfactory characteristics can be achieved.

By setting the specific resistance of the low-resistance layer B approximately to 0.01 to 0.02 Ωcm, desirable characteristics are achieved. Naturally it is preferred that the specific resistance of the low-resistance layer B be equal to or smaller than 0.01 Ωcm, but this is not easy from the viewpoint of manufacturing technique. However, it has been revealed that a sufficient detecting sensitivity can be obtained even with a specific resistance of about 0.01 to 0.02 Ωcm. Conversely, in the electrodes 51-1 to 51-4, 52-1 to 52-4, 53-1 to 53-4, 54-1 and 54-4, 55-1 to 55-4, and 56-1 to 56-4, if the specific resistance of the low-resistance layer B is increased approximately to 3 to 5 Ωcm, the resistances resulting from the wiring portions connecting the fixed electrodes to the pads and the frames and beams connecting the movable electrodes to the pads 20b increase with respect to the capacitances of capacitors constituted by the fixed electrodes and the movable electrodes. Thus the sensitivity of the electrodes deteriorates.

In regard to the beams 33-1 to 33-4, 42a to 42d, 43a to 43d, 44a to 44d, and 45a to 45d, as shown in FIGS. 3 and 4, the distances between adjacent beams or members are equivalent and set to 30 μm or more. For instance, the elongated portion 31-1 of the main frame 30-1 and the arm portion 22-1 of the vibrator 20 are on opposed sides of the beam 33-1 with respect to the axial direction thereof. A horizontal distance L1 between the beam 33-1 and the elongated portion 31-1 of the main frame 30-1 and a horizontal distance L2 between the beam 33-1 and the arm portion 22-1 of the vibrator 20 are equivalent and set to 30 μm or more. The same holds true for the beams 33-2 to 33-4. Further, horizontal distances L3, L4, and L5 among the beams 42a, 43a, 42b, and 43b are equivalent and set to 30 μm or more. The same holds true for the beams 43c, 42c, 43d, and 42d, the beams 45a, 46a, 45b, and 46b, and the beams 46c, 45c, 46d, and 45d.

Figure 5A:
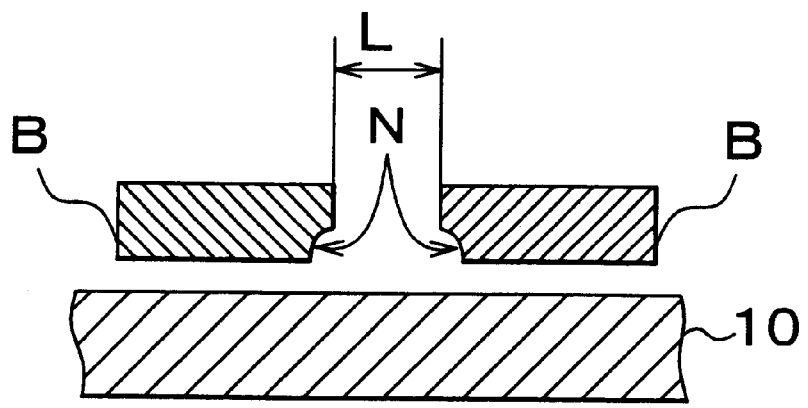
FIG. 5A is a sectional view of a semiconductor device, illustrating a situation in which a notch develops.
Figure 5B:
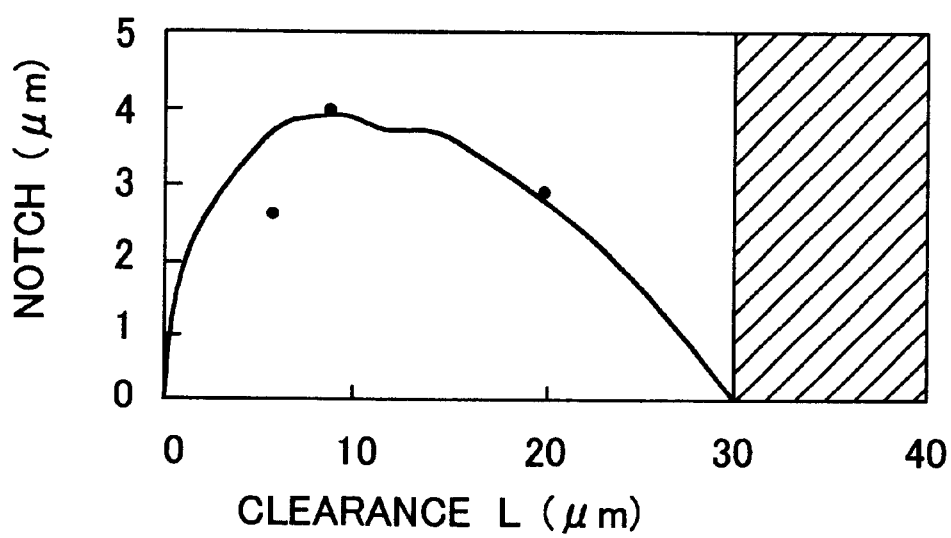
FIG. 5B is a graph illustrating the distance between members and a situation in which a notch develops.

By equally spacing one beam from beams on opposed sides thereof, the beams can be formed symmetrically with respect to the axial direction and the influence exerted on the characteristics of the device can be eliminated. Conversely, if one beam is not equally spaced from members such as beams on opposed sides thereof, the beams cannot be easily formed symmetrically with respect to the axial direction and thus the characteristics of the device are greatly affected. Further, in the case where a gap L is left between low-resistance layers B and B as shown in FIG. 5A, if the distances L1 to L5 are set to 30 μm, development of a notch N can be prevented during etching in manufacturing processes of the beams. The graph of FIG. 5B shows a relation between the gap L and the depth of the notch N. As can also be understood from this graph, development of the notch N can be prevented by setting the gap to 30 μm. That is, since development of the notch N can be prevented and the dispersion among the different parts can be reduced by setting the distances L1 to L5 to 30 μm or more, the detecting precision of the device can be improved. The aforementioned setting of distances should be applied not only to the beams but also to other members requiring a high degree of dimensional precision.

Figure 7:
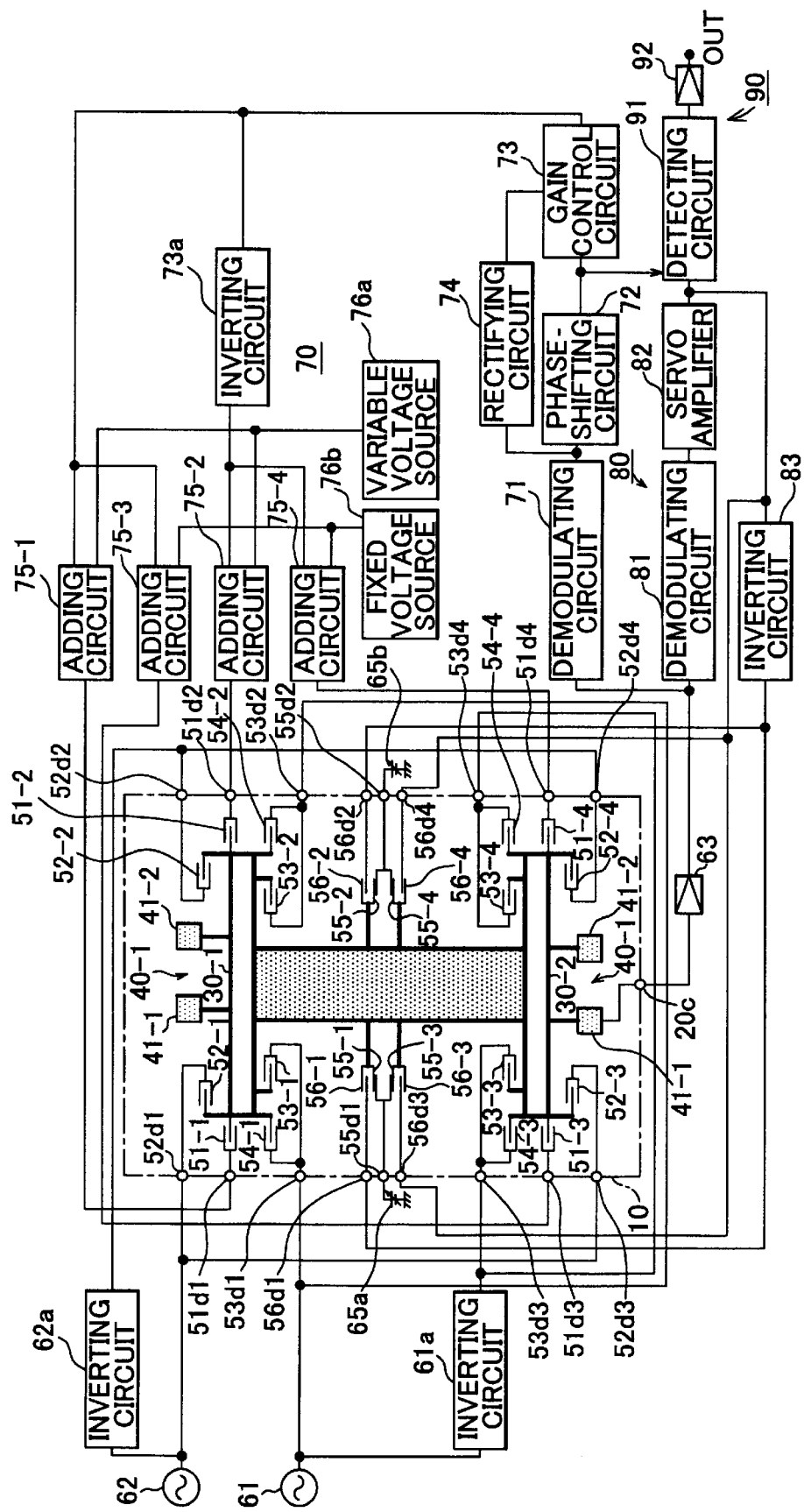
FIG. 7 is a block diagram of an electric circuit apparatus for detecting the angular speed using an angular speed detecting device according to the first embodiment.

Next, an electric circuit apparatus for detecting the angular speed by using the angular speed detecting device constructed as described above will be described. FIG. 7 illustrates the electric circuit apparatus in a block diagram.

A high-frequency oscillator 61 is connected to the electrode pads 53d1, 53d2 that are common to the detecting electrodes 53-1, 53-2 and the correcting electrodes 54-1, 54-2. The oscillator 61 supplies the pads 53d1, 53d2 with a detecting signal $E_1\sin(2\pi f_1 t)$ of a frequency $f_1$ that is much higher than the resonance frequency of the vibrator 20. A phase inverting circuit 61a is connected to the high-frequency oscillator 61. The circuit 61a supplies the electrode pads 53d3, 53d4 that are common to the detecting electrodes 53-3, 53-4 and the correcting electrodes 54-3, 54-4 with a detecting signal $E_1\sin(2\pi f_1 t+\pi)$ obtained by inverting the phase of the detecting signal $E_1\sin(2\pi f_1 t)$.

A high-frequency oscillator 62 is connected to the electrode pads 52d1, 52d3 of the drive monitor electrodes 52-1, 52-3. The oscillator 62 supplies the electrode pads 52d1, 52d3 with a monitoring signal $E_2\sin(2\pi f_2 t)$ of a frequency $f_2$ that is much higher than the resonance frequency of the vibrator 20 and that is different from the frequency $f_1$. A phase inverting circuit 62a is connected to the high-frequency oscillator 62. The phase inverting circuit 62a supplies the electrode pads 52d2, 52d4 of the drive monitor electrodes 52-2, 52-4 with a monitoring signal $E_2\sin(2f_2 t+\pi)$ obtained by inverting the phase of the monitoring signal $E_2\sin(2f_2 t)$. Therefore, if the vibrations of the vibrator 20 in the direction of the X and Y-axes are represented by $E_{0x}\sin(2\pi f_0 t)$ and $E_{0y}\sin(2\pi f_0 t)$, the signals that are outputted from the electrode pad 20c and indicate the vibrations in the direction of the X-axis and the Y-axis can be expressed as $E_2 \cdot E_{0x} \cdot \sin(2\pi f_0 t) \cdot \sin(2\pi f_2 t)$ and $E_1 \cdot E_{0y} \cdot \sin(2\pi f_0 t) \cdot \sin(2\pi f_1 t)$, where $f_0$ is a frequency close to the resonance frequency of the vibrator 20.

A driving circuit 70 is connected to the electrode pads 51d1 to 51d4 of the driving electrodes 51-1 to 51-4. The driving circuit 70 generates a drive signal based on a signal inputted from the electrode pad 20c via an amplifier 63, and supplies the generated signal to the electrode pads 51d1 to 51d4.

The driving circuit 70 has a demodulating circuit 71, a phase shifting circuit 72, and a gain control circuit 73 that are connected to the amplifier 63 in series. The driving circuit 70 further has a rectifying circuit 74 that is connected to the demodulating circuit 71 and that controls the gain of the gain control circuit 73.

The demodulating circuit 71 performs synchronous detection of the signal from the electrode pad 20c at the frequency $f_2$ (i.e., extracts the envelope of amplitude of the signal of the frequency $f_2$), and outputs a signal $E_{0x}\sin(2\pi f_0 t)$ indicating the component of vibration of the vibrator 20 in the direction of the X-axis. The phase shifting circuit 72 advances the phase of an input signal by $\pi/2$ for the purpose of correction for a delay of $\pi/2$ (corresponding to $1/8\pi f_0$ second) of a detection signal indicating the vibrations of the vibrator 20 from the signal for driving the vibrator 20, and outputs the phase-advanced signal. The rectifying circuit 74 performs full-wave rectification of the signal from the demodulating circuit 71 (i.e., extracts the envelope of amplitude of the component of vibration of the vibrator 20 in the direction of the X-axis), and outputs a signal $E_{0x}$ indicating the amplitude of the component of vibration of the vibrator 20 in the direction of the X-axis. Note that the gain control circuit 73 eliminates ripples included in the output signal from the rectifying circuit 74. The gain control circuit 73 controls the amplitude of the output signal from the phase shifting circuit 72 so that the amplitude of the input signals of the phase shifting circuit 72 and the rectifying circuit 74 (the amplitude of the component of vibration of the vibrator 20 in the direction of the X-axis) becomes constant, and then outputs the amplitude-controlled signal. That is, the gain control circuit 73 controls the signal so that the amplitude of the output signal of the gain control circuit 73 decreases as the signal from the rectifying circuit 74 increases, and outputs the controlled signal.

The driving circuit 70 is further provided with adding circuits 75-1, 75-3 connected to an output of the gain control circuit 73, and adding circuits 75-2, 75-4 connected to the gain control circuit 73 via a phase inverting circuit 73a. The phase inverting circuit 73a inverts the phase of the signal from the gain control circuit 73, and outputs the phase-inverted signal. The adding circuits 75-1, 75-2 are connected to a variable-voltage power supply 76a that outputs a variably adjusted direct-current voltage $E_T$. The adding circuits 75-3, 75-4 are connected to a constant-voltage power supply 76b that outputs a fixed direct-current voltage $E_B$.

The adding circuit 75-1 adds the signal $E_{0x}'\sin(2\pi f_0 t)$ from the gain control circuit 73 to the direct-current voltage signal $E_T$ from the variable-voltage power supply 76a, and supplies the added voltage $E_T + E_{0x}'\sin(2\pi f_0 t)$ to the electrode pad 51d1 of the driving electrode 51-1. The adding circuit 75-2 adds the signal $E_{0x}'\sin(2\pi f_0 t + \pi)$ from the phase inverting circuit 73a to the direct-current voltage signal $E_T$ from the variable-voltage power supply 76a, and supplies the added voltage $E_T + E_{0x}'\sin(2\pi f_0 t + \pi)$ to the electrode pad 51d2 of the driving electrode 51-2. The adding circuit 75-3 adds the signal $E_{0x}'\sin(2\pi f_0 t)$ from the gain control circuit 73 to the direct-current voltage signal $E_B$ from the constant-voltage power supply 76b, and supplies the added voltage $E_B + E_{0x}'\sin(2\pi f_0 t)$ to the electrode pad 51d3 of the driving electrode 51-3. The adding circuit 75-4 adds the signal $E_{0x}'\sin(2\pi f_0 t + \pi)$ from the phase inverting circuit 73a to the direct-current voltage signal $E_B$ from the constant-voltage power supply 76b, and supplies the added voltage $E_B + E_{0x}'\sin(2\pi f_0 t + \pi)$ to the electrode pad 51d4 of the driving electrode 51-4.

A direct-current variable-voltage power supply 65a is connected to the electrode pad 55d1 that is common to the adjusting electrodes 55-1, 55-3. A direct-current variable-voltage power supply 65b is connected to the electrode pad 55d2 that is common to the adjusting electrodes 55-2, 55-4. While the direct-current variable-voltage power supplies 65a, 65b may be constituted by a plurality of power supplies, it is also possible to use a single power supply commonly.

A servo control circuit 80 is connected to the electrode pads 56d1 to 56d4 of the servo electrodes 56-1 to 56-4. The servo control circuit 80 reduces the vibrations of the vibrator 20 in the direction of the Y-axis and is composed of a demodulating circuit 81, a servo amplifier 82, and a phase inverting circuit 83. The demodulating circuit 81 performs synchronous detection of the signal from the electrode pad 20c at the frequency $f_1$ (i.e., extracts the envelope of amplitude of the signal of the frequency $f_1$), extracts a signal $E_{0y}\sin(2\pi f_0 t)$ indicating the component of vibration of the vibrator 20 in the direction of the Y-axis, and outputs the signal $E_{0y}\sin(2\pi f_0 t)$ as an alternating-current servo control signal. The servo amplifier 82 amplifies the alternating-current servo control signal with a predetermined gain, and supplies the gain-controlled alternating-current servo control signal to the electrode pads 56d3, 56d4 of the servo electrodes 56-3, 56-4 for the purpose of counterbalancing the vibrations of the vibrator 20 in the direction of the Y-axis (the vibrations of the vibrator 20 in the direction of the Y-axis due to the angular speed occurring about the Z-axis). The phase inverting circuit 83 inverts the phase of the gain-controlled alternating-current servo control signal, and supplies the phase-inverted reverse-phase control signal to the electrode pads 56d1, 56d2 of the servo electrodes 56-1, 56-2.

An output circuit 90 composed of a detecting circuit 91 and an amplifier 92 is connected to the servo control circuit 80. The detecting circuit 91 receives an alternating-current servo control signal $E_{0y}\sin(2\pi f_0 t)$ from the servo amplifier 82, receives a signal $E_{0x}\sin(2\pi f_0 t)$ indicating the vibrations of the vibrator 20 in the direction of the X-axis due to the driving from the phase shifting circuit 72, performs synchronous detection of the alternating-current servo control signal $E_{0y}\sin(2\pi f_0 t)$ with the signal $E_{0x}\sin(2\pi f_0 t)$ indicating the vibrations of the vibrator 20 in the direction of the X-axis, and outputs a direct-current signal indicating the amplitude $E_{0y}$ of the vibrations of the vibrator 20 in the direction of the Y-axis, that is, the magnitude of the vibrations of the vibrator 20 in the direction of the Y-axis due to the angular speed occurring about the Z-axis. The output signal from the phase shifting circuit 72 is used herein because it is synchronized with the phase of a Coriolis' force resulting from the angular speed of the vibrator 20 occurring about the Z-axis and with the alternating-current servo control signal, that is, the angular speed of the vibrator 20 occurring about the Z-axis.

Coriolis' force will be briefly described. If a rectangular coordinate system rotating at an angular speed $\omega$ is assumed relative to a rest rectangular coordinate system, motion can be described in a view from the rotating coordinate system, taking into consideration the force that acts in the inertia system as well, and two other forces, that is, centrifugal force and another force. The latter force is Coriolis' force.

The amplifier 92, which is connected to the detecting circuit 91, receives the signal $E_{0y}$ and outputs from an output terminal OUT a direct-current signal indicating the magnitude of the vibrations of the vibrator 20 in the direction of the Y-axis.

In the embodiment constructed as described above, after the angular speed detecting device has been connected to the electric circuit apparatus to constitute the angular speed detecting apparatus as shown in FIG. 7, the signal indicating the magnitude of the vibrations of the vibrator 20 in the direction of the Y-axis is extracted from the output terminal OUT with the angular speed occurring about the Z-axis being set to "0" prior to the shipment of the apparatus. In this case, since the angular speed is "0", the output signal is "0". Should the output signal be unequal to "0", the direct-current voltage signal $E_T$ is changed by adjusting the variable-voltage power supply 76a so that the output signal becomes "0".

This will be further described. Driving voltage signals $E_T + E_{0x}'\sin(2\pi f_0 t)$, $E_T + E_{0x}'\sin(2\pi f_0 t + \pi) = E_T - E_{0x}'\sin(2\pi f_0 t)$ are applied to the driving electrodes 51-1, 51-2, respectively. Driving voltage signals $E_B + E_{0x}'\sin(2\pi f_0 t)$, $E_B + E_{0x}'\sin(2\pi f_0 t + \pi) = E_B - E_{0x}'\sin(2\pi f_0 t)$ are applied to the driving electrodes 51-3, 51-4, respectively. In the case where the angular speed detecting device is constructed with high precision, if the direct-current voltage signal $E_T$ from the variable-voltage power supply 76a and the direct-current voltage signal $E_B$ from the constant-voltage power supply 76b are equally set, equal forces resulting from electrostatic attracting forces act on the main frames 30-1, 30-2 in the direction of the X-axis. Thus, the main frames 30-1, 30-2 ought to be synchronized at the vibration frequency $f_0$ in the direction of the X-axis and vibrate with an equal amplitude. The vibrations are also conveyed to the vibrator 20 via the beams 33-1 to 33-4, and the vibrator 20 vibrates only in the direction of the X-axis. Accordingly, the signal that has been extracted from the output terminal OUT and that indicates the magnitude of the vibrations of the vibrator 20 in the direction of the Y-axis ought to be "0".

In this case, due to the operation of the high-frequency oscillator 62, the phase inverting circuit 62a, and the drive monitor electrodes 52-1 to 52-4, the signal $E_2 \cdot E_{0x} \cdot \sin(2\pi f_0 t) \cdot \sin(2\pi f_2 t)$ indicating the component of vibration in the direction of the X-axis is supplied to the driving circuit 70 via the electrode pad 20c and the amplifier 63. The demodulating circuit 71, the rectifying circuit 74, the phase shifting circuit 72, and the gain control circuit 73 that constitute the driving circuit 70 operate so that the input signal $E_{0x}\sin(2\pi f_0 t)$ that is from the electrode pad 20c, and that indicates the component of vibration in the direction of the X-axis, becomes always constant. Thus, the vibrator 20 always vibrates with a constant amplitude in the direction of the X-axis.

On the other hand, in the case where the main frames 30-1, 30-2 are unevenly driven in the direction of the X-axis due to the dispersion among the members of the angular speed detecting device, in particular, the process-wise dispersion among the main frames 30-1, 30-2, the beams 33-1 to 33-4, the drive electrodes 51-1 to 51-4, and so on (even if the direct-current voltage signals $E_T$, $E_B$ are equal to each other), the vibrator 20 vibrates in the direction of the Y-axis.

Now, driving forces F1, F2 for the main frames 30-1, 30-2 will be considered. The driving force F1 results from the driving voltage signals $E_T + E_{0x}'\sin(2\pi f_0 t)$, $E_T - E_{0x}'\sin(2\pi f_0 t)$ and can be expressed by Equation 1 shown below using a proportional constant K.

$$F1 = K \cdot \{(E_T + E_{0x}'\sin(2\pi f_0 t))^2 - (E_T - E_{0x}'\sin(2\pi f_0 t))^2\} = 4 \cdot K \cdot E_T \cdot E_{0x}'\sin(2\pi f_0 t) \quad \text{Equation 1}$$

The driving force F2 results from the driving voltage signals $E_B + E_{0x}'\sin(2\pi f_0 t)$, $E_B - E_{0x}'\sin(2f_0 t)$ and can be expressed by Equation 2 shown below.

$$F2 = K \cdot \{(E_B + E_{0x}'\sin(2\pi f_0 t))^2 - (E_B - E_{0x}'\sin(2\pi f_0 t))^2\} = 4 \cdot K \cdot E_B \cdot E_{0x}'\sin(2\pi f_0 t) \quad \text{Equation 2}$$

As can also be understood from the Equations 1 and 2, the driving forces for the main frames 30-1, 30-2 can be adjusted by changing the magnitude of the direct-current voltage signal $E_T$ outputted from the variable-voltage power supply 76a. Thus, the components of vibration of the vibrator 20 and the main frames 30-1, 30-2 in the direction of the Y-axis can be eliminated.

The resonance frequency of the vibrator 20 in the direction of the Y-axis is adjusted by adjusting the voltages of the direct-current variable-voltage power supplies 65a, 65b. That is, if the voltages of the direct-current variable-voltage power supplies 65a, 65b are changed, the magnitudes of electrostatic attracting forces generated by the adjusting electrodes 55-1 to 55-4 change, and the amount of displacement of the vibrator 20 for a force in the direction of the Y-axis, that is, the spring constant of the detecting beams 33-1 to 33-4 is changed. Thus, the resonance frequency of the vibrator 20 in the direction of the Y-axis is appropriately adjusted.

Next, the operation of detecting the angular speed occurring about the Z-axis using the angular speed detecting apparatus adjusted as described above will be described. First of all, the angular speed detecting apparatus is fixed to an object the angular speed of which is to be detected, and then, the electric circuit apparatus is operated as described above.

If an angular speed occurs about the Z-axis while the above-described state is maintained, the vibrator 20 starts to vibrate in the direction of the Y-axis with an amplitude proportional to the angular speed due to Coriolis' force.

In this case, due to the vibrations of the vibrator 20 in the direction of the Y-axis, the capacitance of the detecting electrodes 53-1 to 53-4 changes in accordance with the vibrations. The change in capacitance appears in the electrode pad 20c as a signal modulated in amplitude from the detecting signals $E_1\sin(2\pi f_1 t)$ and $E_1\sin(2\pi f_1 t + \pi) = -E_1\sin(2\pi f_1 t)$ outputted from the high-frequency oscillator 61 and the phase inverting circuit 61a, that is, as a signal $E_1 \cdot E_{0y} \cdot \sin(2\pi f_0 t) \cdot \sin(2\pi f_1 t)$. The signal is then outputted to the servo control circuit 80 via the amplifier 63.

On the other hand, even while the main frames 30-1, 30-2 and the vibrator 20 are vibrating with respect to the substrate 10 in a direction diagonal to the X-axis due to the driving of the driving electrodes 51-1 to 51-4, the influence of the diagonal vibration is eliminated by the correcting electrodes 54-1 to 54-4. That is, the high-frequency detecting signal from the high-frequency oscillator 61 is supplied to the fixed electrodes 53a1, 53a2 of the detecting electrodes 53-1, 53-2 and the fixed electrodes 54a1, 54a2 of the correcting electrodes 54-1, 54-2. The signal that is from the phase inverting circuit 61a and that is obtained by inverting the phase of the high-frequency signal is supplied to the fixed electrodes 53a3, 53a4 of the detecting electrodes 53-3, 53-4 and the fixed electrodes 54a3, 54a4 of the correcting electrodes 54-3, 54-4.

As described above, when the main frames 30-1, 30-2 and the vibrator 20 are displaced in the same direction along the Y-axis, the capacitance of the correcting electrodes 54-1 to 54-4 changes in inverse relation to the capacitance of the detecting electrodes 53-1 to 53-4. Therefore, if the vibrator 20 and the main frames 30-1, 30-2 vibrate simultaneously in the direction diagonal to the X-axis, the change in capacitance of the correcting electrodes 54-1 to 54-4 is eliminated from the change in capacitance of the detecting electrodes 53-1 to 53-4. The change in capacitance of the detecting electrodes 53-1 to 53-4 results from the component of vibration of the vibrator 20 in the direction of the Y-axis. The change in capacitance of the correcting electrodes 54-1 to 54-4 results from the components of vibration of the main frames 30-1, 30-2 in the direction of the Y-axis. Thus, the signal $E_1 \cdot E_{0y} \cdot \sin(2\pi f_0 t) \cdot \sin(2\pi f_1 t)$ that is free from the influence of the diagonal vibrations of the main frames 30-1, 30-2 and the vibrator 20 and that is obtained by modulating the amplitude of the high-frequency signal $E_1 \cdot \sin(2\pi f_1 t)$ with the vibration of the vibrator 20 in the direction of the Y-axis is outputted from the amplifier 63 to the servo control circuit 81.

The servo control circuit 80 demodulates the signal $E_1 \cdot E_{0y} \cdot \sin(2\pi f_0 t) \cdot \sin(2 f_1 t)$ in the demodulating circuit 81 and extracts the signal $E_{0y} \cdot \sin(2\pi f_0 t)$ indicating the vibrations of the vibrator 20 in the direction of the Y-axis. The servo amplifier 82 and the phase inverting circuit 83 supply the servo electrodes 56-1 to 56-4 with an alternating-current servo control signal, that is, a control signal for reducing the vibration of the vibrator 20 in the direction of the Y-axis, based on the signal $E_{0y} \cdot \sin(2\pi f_0 t)$. Therefore, the servo electrodes 56-1 to 56-4 suppress the vibration of the vibrator 20 in the direction of the Y-axis, that is, the vibration of the vibrator 20 in the direction of the Y-axis resulting from the angular speed occurring about the Z-axis. Ideally the amplitude of the vibration of the vibrator 20 in the direction of the Y-axis is controlled to "0".

Further, the alternating-current servo control signal from the servo amplifier 82 is also supplied to the detecting circuit 91 of the output circuit 90. This alternating-current servo control signal is proportional to the signal $E_{0y} \cdot \sin(2\pi f_0 t)$ indicating the vibrations of the vibrator 20 in the direction of the Y-axis, and the detecting circuit 91 detects the signal $E_{0y} \cdot \sin(2\pi f_0 t)$ at the resonance frequency $f_0$ of the vibrator. Therefore, the direct-current signal $E_{0y}$ indicating the magnitude (amplitude) of the vibrations in the direction of the Y-axis is outputted from the detecting circuit 91. The direct-current signal $E_{0y}$ is then outputted via the amplifier 92. Thus, although the vibrator 20 is actually not vibrating in the direction of the Y-axis, the signal indicating the magnitude of the angular speed occurring about the Z-axis is extracted. Due to such an effect of servo control, the vibration of the vibrator 20 in the direction of the Y-axis resulting from the angular speed occurring about the Z-axis is prevented from being inputted again to the vibrator 20 via the substrate 10. Therefore, generation of noise resulting from the re-inputting of the vibration is suppressed and thus the precision in detection of the angular speed can be improved.

Figure 8:
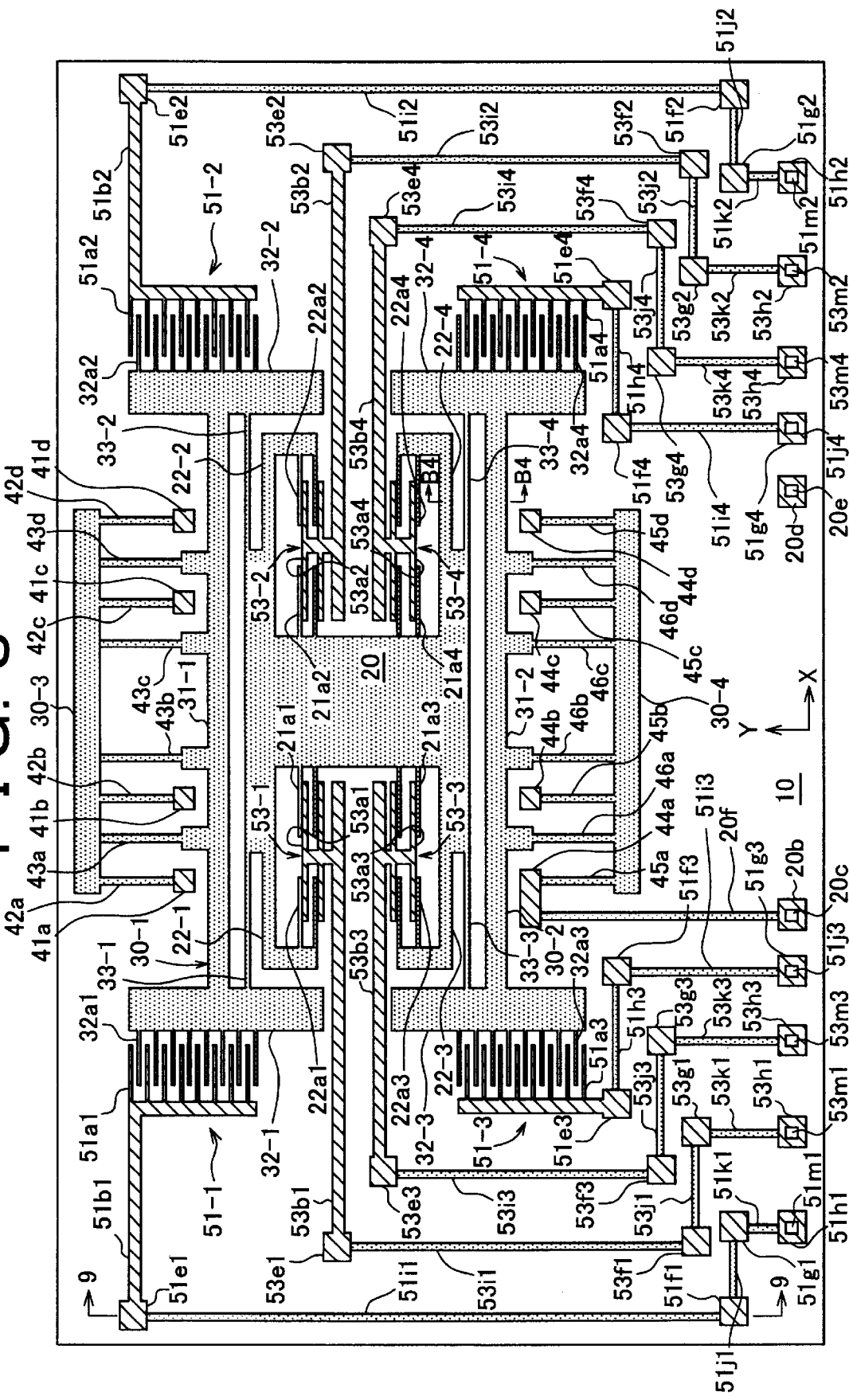
FIG. 8 is a plan view of an angular speed detecting device according to a second embodiment of the invention.

Next, an angular speed detecting device according to a second embodiment of the invention will be described. FIG. 8 shows the angular speed detecting device of the second embodiment in a plan view. The angular speed detecting device of the second embodiment is characterized in that wiring patterns extend from pads and that the wiring patterns are devised ingeniously. For simplification, the drawing of this angular speed detecting device shows only the driving electrodes 51-1 to 51-4 and the detecting electrodes 53-1 to 53-4 and omits the drive monitor electrodes 52-1 to 52-4, the correcting electrodes 54-1 to 54-4, the adjusting electrodes 55-1 to 55-4, and the servo electrodes 56-1 to 56-4.

Figure 9:
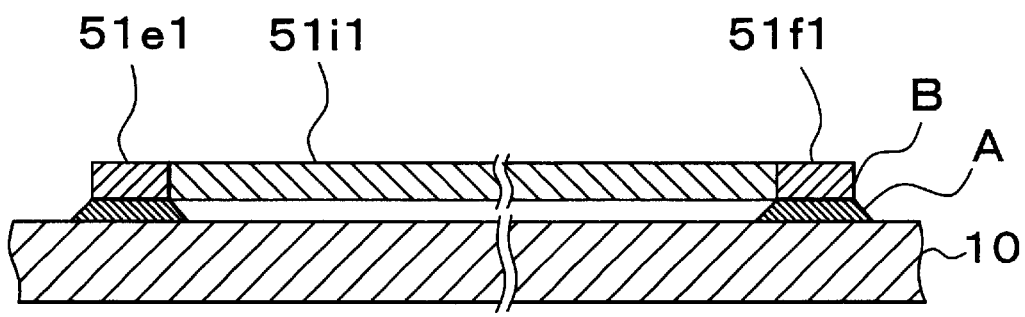
FIG. 9 is a sectional view taken along a line 9—9 shown in FIG. 8.

Each of the wiring portions 51b1, 51b2 of the driving electrodes 51-1, 51-2 has, at its outward end, an anchor 51e1, 51e2. In the drawing, anchors 51f1, 51f2 are provided below the anchors 51e1, 51e2, respectively. Anchors 51g1, 51g2 are provided inward of the anchors 51f1, 51f2, respectively, with respect to the direction of the X-axis. In the drawing, anchors 51h1, 51h2 are provided below the anchors 51g1, 51g2, respectively. FIG. 9 shows the anchors 51e1, 51f1 as the representative of the anchors 51e1 to 51h1 and 51e2 to 51h2. These anchors are designed to fix the low-resistance layer (electric conductor) B onto the substrate 10 via the insulating layer A. The anchors 51e1 to 51h1 are interconnected by wiring patterns 51i1 to 51k1, and the anchors 51e2 to 51h2 are interconnected by wiring patterns 51i2 to 51k2. FIG. 9 shows the wiring pattern 51i1 as the representative of the wiring patterns 51i1 to 51k1 and 51i2 to 51k2. These wiring patterns are constituted by the low-resistance layer (electric conductor) B that is spaced from the substrate 10. Electrode pads 51m1, 51m2 are provided on the anchors 51h1, 51h2 respectively.

In the drawing, each of the fixed electrodes 51a3, 51a4 of the driving electrodes 51-3, 51-4 has, at its lower end, an anchor 51e3, 51e4. Anchors 51f3, 51f4 are provided inward of the anchors 51e3, 51e4, respectively, with respect to the direction of the X-axis. In the drawing, anchors 51g3, 51g4 are provided below the anchors 51f3, 51f4 respectively. The anchors 51e3 to 51g3 and 51e4 to 51g4 are also designed to fix the low-resistance layer (electric conductor) B onto the substrate 10 via the insulating layer A. The anchors 51e3 to 51g3 are interconnected by wiring patterns 51h3, 51i3, and the anchors 51e4 to 51g4 are interconnected by wiring patterns 51h4, 51i4. The wiring patterns 51h3, 51i3, 51h4 and 51i4 are also constituted by the low-resistance layer B that is spaced from the substrate 10. The electrode pads 51j3, 51j4 are provided on the anchors 51g3, 51g4 respectively.

Each of the wiring portions 53b1 to 53b4 of the driving electrodes 53-1 to 53-4 has, at its outward end, an anchor 53e1 to 53e4. In the drawing, anchors 53f1 to 51f4 are provided below the anchors 53e1 to 53e4, respectively. Anchors 53g1 to 53g4 are provided inward of the anchors 53f1 to 53f4, respectively, with respect to the direction of the X-axis. In the drawing, anchors 53h1 to 53h4 are provided below the anchors 53g1 to 53g4, respectively. The anchors 53e1 to 53h1, 53e2 to 53h2, 53e3 to 53h3, and 53e4 to 53h4 are designed to fix the low-resistance layer (electric conductor) B onto the substrate 10 via the insulating layer A. The anchors 53e1 to 53h1, 53e2 to 53h2, 53e3 to 53h3, and 53e4 to 53h4 are interconnected by wiring patterns 53i1 to 53k1, 53i2 to 53k2, 53i3 to 53k3, and 53i4 to 53k4 respectively. The wiring patterns 53i1 to 53k1, 53i2 to 53k2, 53i3 to 53k3, and 53i4 to 53k4 are also constituted by the low-resistance layer (electric conductor) B that is spaced from the substrate 10. Electrode pads 53m1 to 53m4 are provided on the anchors 53h1 to 53h4 respectively.

Further, the anchor 44a and the pad 20b are electrically connected by a wiring pattern 20f that is spaced a predetermined distance from the substrate 10. Furthermore, a grounding anchor 20d that fixes the low-resistance layer (electric conductor) B to the substrate 10 via the insulating layer A is also provided on the substrate 10.

Also, in the case where the drive monitor electrodes 52-1 to 52-4, the correcting electrodes 54-1 to 54-4, the adjusting electrodes 55-1 to 55-4, and the servo electrodes 56-1 to 56-4 are provided on the substrate 10, the wiring patterns as described above are formed. The angular speed detecting device of the second embodiment is also formed according to a manufacturing method identical with that of the first embodiment, and is able to detect the angular speed occurring about the Y-axis that is perpendicular to the substrate 10, due to the connection of an electric circuit apparatus (FIG. 7) identical with that of the first embodiment.

In this case, since the wiring patterns are spaced from the upper surface of the substrate 10, their capacitance can be reduced. That is, the capacitance C of the wiring patterns and the substrate 10 can be expressed by Equation 3 shown below.

$$C=\epsilon \cdot S/d \qquad \text{Equation 3}$$

In Equation 3, S is the area of surfaces of the wiring patterns facing the substrate 10, d is the distance between the surfaces of the wiring patterns and the surface of the substrate 10, and $\epsilon$ is the dielectric constant of a material filling a space between the surfaces of the wiring patterns and the substrate 10. The relative dielectric constant of silicon oxide $SiO_2$ constituting the insulating layer A (the ratio of the dielectric constant of silicon oxide $SiO_2$ to the dielectric constant of a vacuum) is "3.8". The relative dielectric constant of air is about 1.0.

Thus, the parasitic capacitance C of the wiring patterns and the substrate 10 can be reduced even in the air by spacing the wiring patterns from the substrate 10 as in the second embodiment. The parasitic capacitance C can be further reduced by covering the upper surface of the angular speed detecting device with a case for accommodating the vibrator 20 and vacuumizing the case.

As a result, according to the second embodiment, the influence of the parasitic capacitance of the wiring patterns on the fixed electrodes can be reduced. That is, according to the second embodiment, the precision in driving the vibrations of the vibrator 20 by the driving electrodes 51-1 to 51-4 can be improved, and the precision in detecting the vibrations of the vibrator 20 by the detecting electrodes 53-1 to 53-4 can be improved. Also, in the case where the drive monitor electrodes 52-1 to 52-4, the correcting electrodes 54-1 to 54-4, the adjusting electrodes 55-1 to 55-4, and the servo electrodes 56-1 to 56-4 are provided on the substrate 10, the effect as described above can be expected due to the wiring patterns.

Next, a method of dimensioning the members of the angular speed detecting device as described above will be described.

Figure 6B:
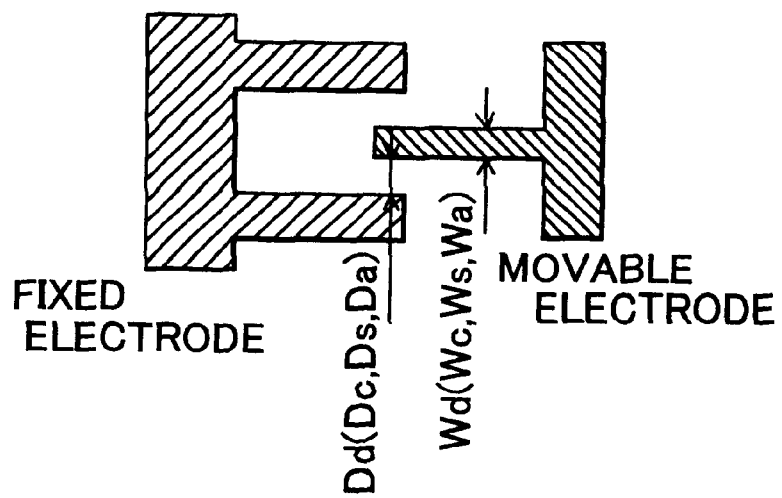
FIG. 6B is an enlarged plan view of fixed and movable electrodes shown in FIG. 1.

The dimensional change of the members of the angular speed detecting device resulting from a processing such as etching is denoted by $\Delta W$, and the dimensions of the members of the angular speed detecting device that require high precision, that is, the dimensions of the short-distance members of the angular speed detecting device are defined as follows. The width of the frames surrounding the square through-holes 21a in the mass portion 21 is denoted by Wm as shown in FIG. 6(a). The width of the beams 33-1 to 33-4, 42a to 42d, 43a to 43d, 45a to 45d, and 46a to 46d is denoted by Wk. As shown in FIG. 6(b), the width of the electrode fingers of the movable and fixed electrodes of the driving electrodes 51-1 to 51-4 is denoted by Wd, and the distance among the electrode fingers is denoted by Dd. The width of the electrode fingers of the movable and fixed electrodes of the drive monitor electrodes 52-1 to 52-4 is denoted by Wc, and the distance among the electrode fingers is denoted by Dc. The width of the electrode fingers of the movable and fixed electrodes of the detecting electrodes 53-1 to 53-4 is denoted by Ws, and the distance among the electrode fingers is denoted by Ds. The width of the electrode fingers of the movable and fixed electrodes of the servo electrodes 56-1 to 56-4 is denoted by Wa, and the distance among the electrode fingers is Da.

In the case where servo control is performed as described above, since a Coriolis' force (a force that acts on the vibrator 20 in the direction of the Y-axis due to the angular speed) $2 \cdot M \cdot V \cdot \Omega$ is equal to a servo force $\epsilon \cdot S \cdot \{(V_{dc}+V_0)^2 - (V_{dc}-V_0)^2\}/2 \cdot Da^2$, Equation 4 shown below is established.

$$2 \cdot M \cdot V \cdot \Omega = \epsilon \cdot S \cdot \{(V_{dc}+V_0)^2 - (V_{dc}-V_0)^2\}/2 \cdot Da^2 \qquad \text{Equation 4}$$

In Equation 4, M is the mass of the mass portion 21, V is the drive vibration speed of the mass portion 21, $\Omega$ is the angular speed (yaw rate), $\epsilon$ is the dielectric constant, S is the area of the servo electrodes 56-1 to 56-4, $V_{dc}$ is the direct-current bias voltage of the servo electrodes 56-1 to 56-4, and $V_0$ is the alternating-current output voltage. Equation 4 is modified into Equation 5 shown below.

$$V_0 = M \cdot Da^2 \cdot V \cdot \Omega / \epsilon \cdot S \cdot V_{dc} \qquad \text{Equation 5}$$

It is assumed herein that Ad denotes the driving amplitude and that $\omega d$ denotes the driving resonance frequency. Because the driving vibration speed V is equal to the product $Ad \cdot \omega d$ of the driving amplitude Ad and the driving resonance frequency $\omega d$, Equation 6 shown below is established.

$$V_0 = M \cdot Da^2 \cdot Ad \cdot \omega d \cdot \Omega / \epsilon \cdot S \cdot V_{dc} \qquad \text{Equation 6}$$

If the dimensional change $\Delta W$ is taken into consideration, Equation 6 is expressed as Equation 7 shown below.

$$V_0 = M \cdot (1+\Delta W/Wm) \cdot Da^2 \cdot (1-\Delta W/Da)^2 \cdot Ad \cdot (1-\Delta W/Dc) \cdot \omega d \cdot (1+\Delta W/Wk) \cdot \Omega / \epsilon \cdot S \cdot V_{dc} \qquad \text{Equation 7}$$

By modifying the right side of Equation 7, Equation 8 shown below is substantially established.

$$V_0 = M \cdot Da^2 \cdot Ad \cdot \omega d \cdot \Omega \{1+\Delta W(1Wm-2/Da-1Dc+1/Wk)\}/\epsilon \cdot S \cdot V_{dc} \qquad \text{Equation 8}$$

As long as (1/Wm−2Da−1/Dc+1/Wk) in Equation 8 is made equal to "0", even if the dimensional change $\Delta W$ has increased to a certain extent, the output voltage $V_0$ is defined as in Equations 5 and 6 without being affected by the dimensional change $\Delta W$. Thus, if the widths Wm, Wk and the distances Da, Dm are set such that Equation 9 shown below is established (e.g., Wm=Wk=4 $\mu$m, Da=8 $\mu$m, and Dc=4 $\mu$m), a stable sensitivity of the angular speed detecting device can be obtained without being affected by errors (dispersion) in the manufacturing processes thereof. That is, the detecting precision of the angular speed detecting device is improved. Such a design also brings about an improvement in the yield of the angular speed detecting device.

$$1/Wm+1/Wk-2/Da-1/Dc=0 \qquad \text{Equation 9}$$

In the case where servo control is not performed in an angular speed detecting device as described above, that is, in the case of an open loop with the servo electrodes 56-1 to 56-4 dispensed with, if the widths Wm, Wk and the distances Ds, Dc are set by a calculation as described above such that Equation 10 shown below is established, the influence of errors (dispersion) in the manufacturing processes of the angular speed detecting device can be eliminated.

$$1/Wm-1/Wk-2/Ds-1/Dc=0 \qquad \text{Equation 10}$$

Figure 10:
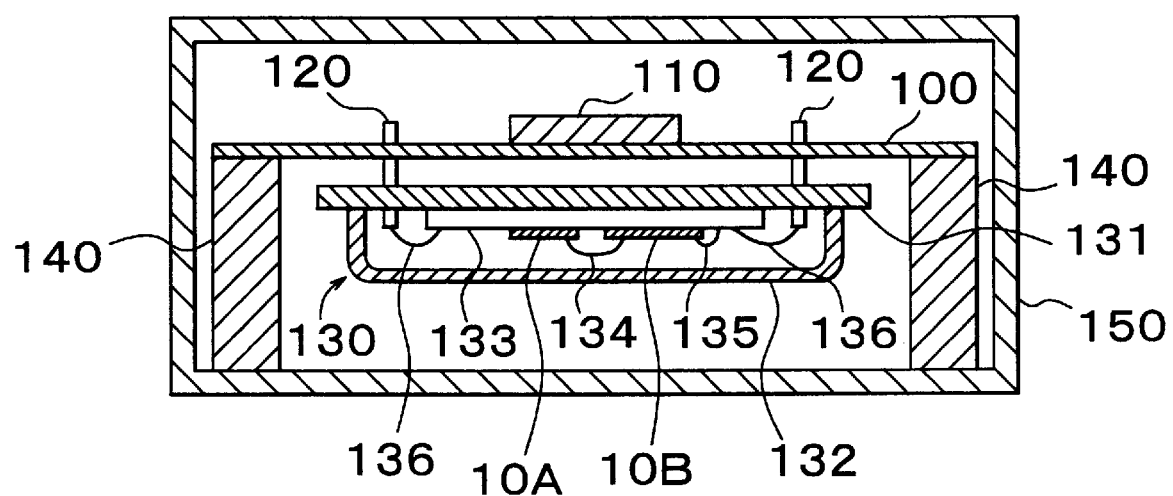
FIG. 10 is a sectional view of an angular speed detecting apparatus mounted with the angular speed detecting devices according to the first and second embodiments.

Next, an angular speed detecting apparatus (angular speed sensing apparatus) mounted with an angular speed detecting device (angular speed sensing device) 10A according to the above-described first and second embodiments will be described. FIG. 10 shows the apparatus in a sectional view.

This angular speed detecting device 10A is accommodated in a case 130 fitted to a print-circuit board 100. Various electric circuit components 110 are fitted to an upper surface of the print-circuit board 100, and the case 130 is fitted on the side of a lower surface of the board 100 via a plurality of pins 120. The case 130 is maintained in a vacuum state in which the vibrator 20 of the angular speed detecting device 10A can move without the resistance of a gas, such as air. In the case of the second embodiment, the capacity of the wiring patterns is reduced taking into consideration the fact that the relative dielectric constant is low in a vacuum. In the example in which this angular speed detecting device is mounted, the gravity works downwards in the drawing, and FIG. 10 shows the angular speed detecting apparatus in use. The terms "downwards" and "lower surface" and so on in the present specification indicate the gravitational direction whereas the terms "upwards" and "upper surface" and so on indicate a direction opposite to the gravitational direction.

The case 130 is composed of a flat mounting plate 131 and a cover 132. A flat fixture plate 133 is fixed to a lower surface of the mounting plate 131, and the angular speed detecting device 10A and a circuit device 10B are fixed to a lower surface of the fixture plate 133 in which the substrate 10 facing upwards. The circuit device 10B is formed from semiconductor materials as in the case of the angular speed detecting device 10A, and various electric circuits such as the driving circuit 70, the servo control circuit 80, the output circuit 90, and so on as shown in FIG. 7 are disposed on the substrate. In the angular speed detecting device 10A and the circuit device 10B, the various functional components on the substrate 10 are disposed in such a manner as to face downwards (in the gravitational direction). For example, the angular speed detecting device 10A, the surface of the substrate 10 (the surface facing the vibrator 20) is directed downwards, and the vibrator 20 is located below the substrate 10.

The angular speed detecting device 10A and the circuit device 10B are electrically connected by a plurality of lead wires 134. Further, wiring patterns are formed also on the lower surface of the fixture plate 133 and are electrically connected to the circuit device 10B via a plurality of lead wires 135. The pins 120 also have the function of electrically connecting the fixture plate 133 to the print-circuit board 100 and are electrically connected to the wiring patterns on the fixture plate 133 via a plurality of lead wires 136.

The print-circuit board 100 is supported on an inner bottom surface of a package 150 by a supporting member 140. The supporting member 140 is formed from an elastic material such as rubber and resin so that vibrations from the package 150 cannot be easily conveyed thereto.

In the case where an angular speed sensing apparatus constructed in this manner is installed in a vehicle, it is appropriate that the resonance frequency of the vibrator 20 of the angular speed detecting device 10A be 4 to 7 KHz. That is, the package 150 is fitted to a vehicle body such that the resonance frequency is approximately 2 KHz or less. In the case where the angular speed detecting device 10A is fitted to the print-circuit board 100 as described above, the resonance frequency of the print-circuit board 100 is approximately 10 KHz or more. In other words, if the angular speed detecting device 10A is securely fitted to the print-circuit board 100, the resonance frequency of the entire print-circuit board 100 can be easily set to 10 KHz or more. Thus, if the resonance frequency of the vibrator 20 is approximately set to 4 to 7 KHz, the angular speed generated in the vehicle, that is, the yaw rate can be precisely detected based on vibrations of the vibrator 20 without being affected by the resonance frequencies of the vehicle body and the print-circuit board 100.

In the angular speed detecting device 10A as described above, if dirt or dust falls on the surface where the vibrator 20 is disposed, displacement of the vibrator 20 is hindered and the angular speed cannot be detected with precision. However, in this case, since the angular speed detecting device 10A is accommodated in the case 130 as described above, dirt, dust, and other contaminants are prevented from entering the space around the angular speed detecting device 10A. During use of this angular speed sensing apparatus, since the angular speed detecting device 10A is fixed to the print-circuit board 100 so that the surface of the substrate 10 where the vibrator 20 is disposed is directed in the gravitational direction, dirt, dust, and so on are prevented from falling on the surface of the vibrator 20 and the surface of the substrate 10 where the vibrator 20 is disposed. For these reasons, displacement of the vibrator 20 is stabilized and thus the detecting precision of the angular speed sensing apparatus is improved. If the inner surface of the case 130 is coated with an adhesive material, for instance, if the inner surface of the case 130 is taped with an adhesive tape, dirt in the case 130 and dirt and dust around the vibrator 20 can be removed more effectively.

Furthermore, according to this embodiment, the different electric circuit components 110 are fitted to the upper surface of the print-circuit board 100, and the case 130 accommodating the angular speed detecting device 10A is fitted to the lower surface of the board 100. Therefore, the entire package 150 constituting the angular speed detecting apparatus (angular speed sensing apparatus) can be constructed in a compact size.

The above-described embodiments are concerned with examples in which the invention has been applied to an angular speed detecting apparatus. However, the invention is also applicable to an accelerator detecting device, an accelerator detecting apparatus, a pressure detecting device, and a pressure detecting apparatus for detecting physical quantities such as force, pressure, and so on resulting from an acceleration acting on the vibrator 20 based on displacement thereof. Also, in these cases, displacement of the vibrator 20 is detected by the detecting electrodes 53-1 to 53-4, but there is no need to vibrate the vibrator 20. Therefore, the driving electrodes 51-1 to 51-4 and the drive monitor electrodes 52-1 to 52-4 can be dispensed with. It is also appropriate for the widths Wm, Wk and the distances Ds, Dc of the acceleration detecting device to be set suitably, for the purpose of counterbalancing the influence of the dimensional change $\Delta W$ of the component members as in the case of the angular speed detecting device 10A. To be more precise, if servo control is performed, it is appropriate that Equation 11 shown below be established. If servo control is not performed, it is appropriate that Equation 12 shown below be established.

$$1/Wm - 2/Da = 0 \qquad \text{Equation 11}$$

$$1/Wm - 3/Wk + 2/Ds = 0 \qquad \text{Equation 12}$$

In the illustrated embodiment, the controller (shown in FIG. 7) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A sensing device comprising:
   a vibrator displaceably supported with respect to a substrate;
   a plurality of electrode pairs, each having a fixed electrode and a movable electrode, wherein:
      the movable electrode is connected to the vibrator and is displaced together with the vibrator with respect to the substrate, and
      the fixed electrode is fixed onto the substrate facing the movable electrode; and
   a plurality of conductors provided on the substrate and connected to the electrode pairs to allow a passage of electric signals, wherein a conductive characteristic, of the same kind of the conductors, are all similar.

2. The sensing device according to claim 1, wherein the same kind of the conductors are equal in a length, a width, and a thickness thereof.

3. The sensing device according to claim 1, further comprising:
   a plurality of beams provided between the substrate and the vibrator to displace the vibrator, wherein:
      a distance between at least one beam and an adjacent member, about any side of the beam, extends equidistant and parallel to the beam.

4. The sensing device according to claim 3, wherein the adjacent member is an adjacent beam.

5. The sensing device according to claim 3, wherein the distance is at least 30 micrometer($\mu$m).

6. The sensing device according to claim 1, wherein:
   the vibrator is connected to a plurality of beams connected to the substrate;
   each of the fixed electrodes is fixed to the substrate and has a plurality of electrode fingers that extend parallel to one another;
   each of the movable electrodes has a plurality of electrode fingers that extend parallel to one another and that are interleaved among the electrode fingers of the fixed electrode;
   the vibrator has a plurality of square through-holes disposed at equal intervals; and
   a spatial relationship is defined by $1/Wm - 2/Da = 0$,
      wherein: Wm is a distance between adjacent ones of the through-holes; and Da is a distance in a width direction between the electrode fingers of the movable and fixed electrodes of a servo electrode for suppressing vibrations of the vibrator when one of the electrodes is the servo electrode.

7. The sensing device according to claim 6, wherein $1/Wm - 2/Da = 0$.

8. The sensing device according to claim 1, wherein:
   the vibrator is connected to a plurality of beams connected to the substrate;
   each of the fixed electrodes is fixed to the substrate and has a plurality of electrode fingers that extend parallel to one another;
   each of the movable electrodes has a plurality of electrode fingers that extend parallel to one another and that are interleaved among the electrode fingers of the fixed electrode;
   the vibrator has a plurality of square through-holes disposed at equal intervals; and
   a spatial relationship is defined by $1/Wm - 3/Wk + 2/Ds = 0$,
      wherein: Wm is a distance between adjacent ones of the through-holes; Wk is a width of the beams; and Ds is a distance in a width direction between the electrode fingers of the movable and fixed electrodes of a detecting electrode for detecting displacement of the vibrator when one of the electrodes is the detecting electrode.

9. The sensing device according to claim 8, wherein $1/Wm - 3/Wk + 2/Ds = 0$.

10. The sensing device according to claim 1, wherein:
    the vibrator is connected to a plurality of beams connected to the substrate;
    each of the fixed electrodes is fixed to the substrate and has a plurality of electrode fingers that extend parallel to one another;
    each of the movable electrodes has a plurality of electrode fingers that extend parallel to one another and that are interleaved among the electrode fingers of the fixed electrode;
    the vibrator has a plurality of square through-holes disposed at equal intervals; and
    a spatial relationship is defined by $1/Wm + 1/Wk - 2/Da - 1/Dc = 0$,
       wherein: Wm is a distance between adjacent ones of the through-holes; Wk is a width of the beams; Da is a distance in a width direction between the electrode fingers of the movable and fixed electrodes of a servo electrode for suppressing vibrations of the vibrator when one of the electrodes is the servo electrode; and Dc is a distance in a width direction between the electrode fingers of the movable and fixed electrodes of a drive monitor electrode that is driven to monitor the vibrator when another one of the electrodes is the drive monitor electrode.

11. The sensing device according to claim 10, wherein $1/Wm + 1/Wk - 2/Da - 1/Dc = 0$.

12. The sensing device according to claim 1, wherein:
    the vibrator is connected to a plurality of beams connected to the substrate;
    each of the fixed electrodes is fixed to the substrate and has a plurality of electrode fingers that extend parallel to one another;
    each of the movable electrodes has a plurality of electrode fingers that extend parallel to one another and that are interleaved among the electrode fingers of the fixed electrode;

the vibrator has a plurality of square through-holes disposed at equal intervals; and a spatial relationship is defined by 1/Wm−1/Wk−2/Ds−1/Dc=0, wherein: Wm is a distance between adjacent ones of the through-holes; Wk is a width of the beams; Ds is a distance in a width direction between the electrode fingers of the movable and fixed electrodes of a detecting electrode for detecting displacement of the vibrator when one of the electrodes is the detecting electrode; and Dc is a distance in a width direction between the electrode fingers of the movable and fixed electrodes of a drive monitor electrode that is driven to monitor the vibrator when another one of the electrodes is the drive monitor electrode.

13. The sensing device according to claim 12, wherein 1/Wm−1/Wk−2/Ds−1/Dc=0.

14. A sensor apparatus comprising:

a sensing device having a vibrator displaceably supported with respect to a surface of a substrate;

at least one electric component; and a board that receives the sensing device and the at least one electric component, wherein the surface of the substrate is directed in a gravitational direction during operation of the sensor apparatus, and wherein the sensing device is the sensing device as claimed in claim 1.

15. A sensing device comprising:

a vibrator displaceably supported with respect to a substrate;

a plurality of electrode pairs, each having a fixed electrode and a movable electrode, wherein:

the movable electrode is connected to the vibrator and is displaced together with the vibrator with respect to the substrate, and the fixed electrode is fixed onto the substrate facing the movable electrode; and a plurality of conductors provided on the substrate and being electrically connected to the electrode pairs to allow a passage of electric signals, wherein:

at least some of the conductors connected to the fixed electrode are spaced from the substrate.

16. The sensing device according to claim 15, wherein the same kind of the conductors are equal in a length, a width, and a thickness.

17. The sensing device according to claim 15, further comprising:

a plurality of beams provided between the substrate and the vibrator to displace the vibrator, wherein:

a distance between at least one beam and an adjacent member, about any side of the beam, extends equidistant and parallel to the beam.

18. The sensing device according to claim 17, wherein the adjacent member is an adjacent beam.

19. The sensing device according to claim 17, wherein the distance is at least 30 micrometer ($\mu$m).

20. A sensor apparatus comprising:

a sensing device having a vibrator displaceably supported with respect to a surface of a substrate;

at least one electric component; and a board that receives the sensing device and the at least one electric component, wherein the surface of the substrate is directed in a gravitational direction during operation of the sensor apparatus, and wherein the sensing device is the sensing device as claimed in claim 15.

21. A sensing device comprising:

a substrate;

a vibrator displaceably supported with respect to the substrate and spaced above the substrate; and a plurality of beams that displaceably support the vibrator with respect to the substrate, wherein a distance between at least one beam and an adjacent member, about any side of the beam, extends equidistant and parallel to the beam.

22. The sensing device according to claim 21, wherein the adjacent member is an adjacent beam.

23. The sensing device according to claim 21, wherein the distance is at least 30 micrometer ($\mu$m).

24. A sensor apparatus comprising:

a sensing device having a vibrator displaceably supported with respect to a surface of a substrate;

at least one electric component; and a board that receives the sensing device and the at least one electric component, wherein the surface of the substrate is directed in a gravitational direction during operation of the sensor apparatus, and wherein the sensing device is the sensing device as claimed in claim 21.

25. A sensor apparatus comprising:

a sensing device having a vibrator displaceably supported with respect to a surface of a substrate;

at least one electric component; and a board that receives the sensing device and at least the electric component, wherein the vibrator is mounted to the surface of the substrate and the surface of the substrate is directed in a gravitational direction when the sensor apparatus is operated.

26. The sensor apparatus according to claim 25, wherein the sensing device is disposed inside a case.

27. The sensor apparatus according to claim 26, wherein an inside of the case is maintained in a vacuum.

* * * * *